US012592138B2

(12) United States Patent
Jeon et al.

(10) Patent No.: US 12,592,138 B2
(45) Date of Patent: Mar. 31, 2026

(54) REAR SEAT PASSENGER NOTIFICATION DEVICE AND A METHOD THEREFOR

(71) Applicants: HYUNDAI MOTOR COMPANY, Seoul (KR); KIA CORPORATION, Seoul (KR)

(72) Inventors: Seul Ki Jeon, Hwaseong-si (KR); Hui Won Shin, Hwaseong-si (KR); Eung Hwan Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 178 days.

(21) Appl. No.: 18/198,870

(22) Filed: May 18, 2023

(65) Prior Publication Data

US 2024/0144801 A1    May 2, 2024

(30) Foreign Application Priority Data

Oct. 31, 2022    (KR) ........................ 10-2022-0142989

(51) Int. Cl.
*G08B 21/02*       (2006.01)
*B60H 1/00*        (2006.01)
(Continued)

(52) U.S. Cl.
CPC ......... *G08B 21/02* (2013.01); *B60H 1/00742* (2013.01); *E05F 15/73* (2015.01);
(Continued)

(58) Field of Classification Search
CPC ........ G08B 21/02; G08B 21/24; G08B 21/22; B60H 1/00742; E05F 15/73;
(Continued)

(56) References Cited

U.S. PATENT DOCUMENTS

| 10,777,068 B2 | 9/2020 | Andrade et al. |
| 10,899,359 B2 | 1/2021 | Kim et al. |

(Continued)

FOREIGN PATENT DOCUMENTS

| DE | 102020126539 A1 | 4/2022 |
| JP | 2006159939 A | 6/2006 |

(Continued)

OTHER PUBLICATIONS

European Search Report cited in European patent application No. 23173103.5; Mar. 25, 2024; 9 pp.

*Primary Examiner* — Shardul D Patel

(74) *Attorney, Agent, or Firm* — Lempia Summerfield Katz LLC

(57)        ABSTRACT

A rear seat passenger notification device includes a sensor device that identifies information about at least one passenger who is present in a host vehicle when the host vehicle enters a lock state. The rear seat passenger notification device also includes an alarm device that performs a visual and audible alarm function, and an information collection device that collects information about the host vehicle and information about a user of the host vehicle The rear seat passenger notification device further includes an action determination and control device that identifies, based on at least one of the information about the at least one passenger, the information about the host vehicle, the information about (Continued)

REAR SEAT PASSENGER
NOTIFICATION DEVICE 100

SENSOR DEVICE
110

ALARM DEVICE
120

INFORMATION COLLECTION
DEVICE 130

ACTION DETERMINATION AND
CONTROL DEVICE 140 the user, or a combination thereof, at least one action item for control of the host vehicle, and provides the user with the at least one action item.

20 Claims, 9 Drawing Sheets

(51) Int. Cl.

| | |
|---|---|
| *E05F 15/73* | (2015.01) |
| *G06V 10/26* | (2022.01) |
| *G06V 20/59* | (2022.01) |
| *G06V 40/10* | (2022.01) |

(52) U.S. Cl.
CPC ............ *G06V 10/26* (2022.01); *G06V 20/593* (2022.01); *G06V 40/10* (2022.01); *E05F 2015/767* (2015.01)

(58) Field of Classification Search
CPC . E05F 2015/767; G06V 10/26; G06V 20/593; G06V 40/10; B60R 21/015; B60R 16/037; B60R 25/24; B60R 25/305; B60Q 1/52; B60Q 1/543; B60Q 5/005; B60W 40/08; B60W 2040/0881

USPC .......................................................... 701/49
See application file for complete search history.

(56)                      References Cited

U.S. PATENT DOCUMENTS

| | | | | |
|---|---|---|---|---|
| 11,782,147 | B2 * | 10/2023 | Murata | .................. B60N 2/003 |
| | | | | 342/27 |
| 12,017,657 | B2 * | 6/2024 | Lin | ...................... G06V 40/103 |
| 2014/0253314 | A1 * | 9/2014 | Rambadt | ............ G08B 21/0266 |
| | | | | 340/457.1 |
| 2020/0143182 | A1 | 5/2020 | Noh | |
| 2020/0353940 | A1 | 11/2020 | Kim et al. | |
| 2021/0362673 | A1 * | 11/2021 | Jeon | ...................... G06V 20/59 |
| 2021/0370860 | A1 * | 12/2021 | Nakamura | ........ B60R 21/01542 |

FOREIGN PATENT DOCUMENTS

| | | | |
|---|---|---|---|
| JP | 2022057088 | A | 4/2022 |
| KR | 100513875 | B1 | 9/2005 |
| KR | 101877673 | B1 | 7/2018 |
| KR | 101996994 | B1 | 7/2019 |
| KR | 20190110193 | A | 9/2019 |
| KR | 20200130605 | A | 11/2020 |
| KR | 102211872 | B1 | 2/2021 |

* cited by examiner

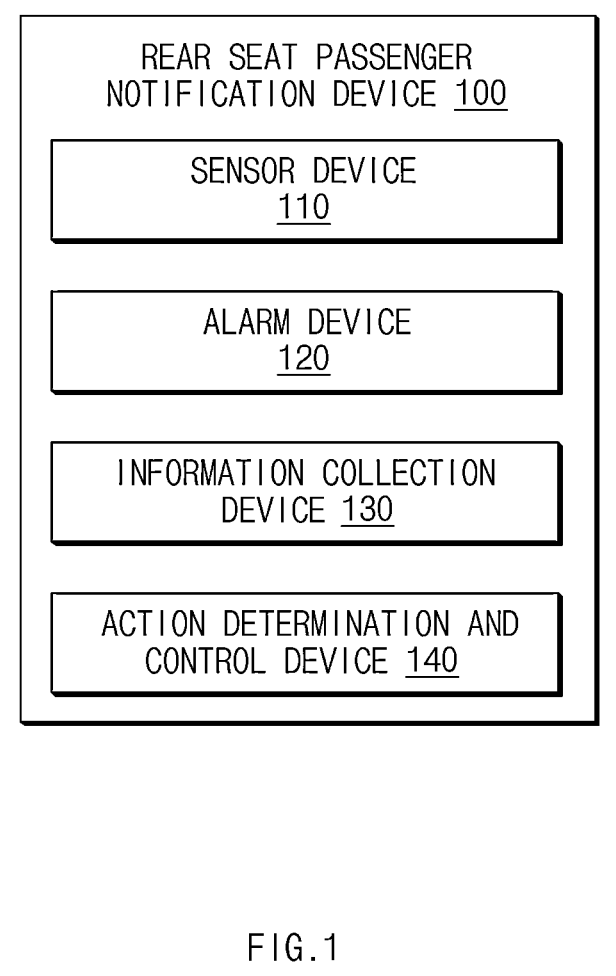

REAR SEAT PASSENGER
NOTIFICATION DEVICE 100

SENSOR DEVICE
110

ALARM DEVICE
120

INFORMATION COLLECTION
DEVICE 130

ACTION DETERMINATION AND
CONTROL DEVICE 140

FIG.1

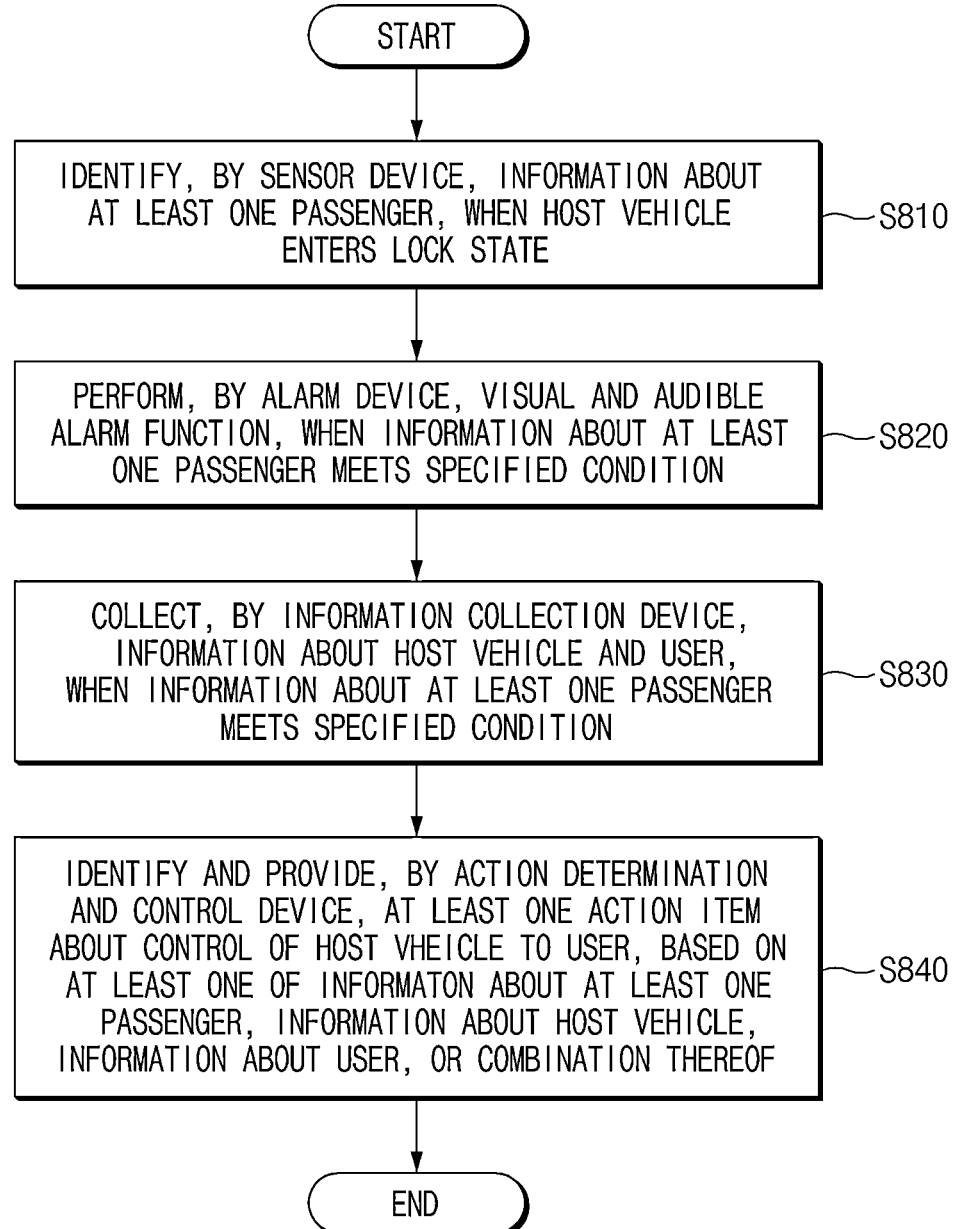

START

IDENTIFY, BY SENSOR DEVICE, INFORMATION ABOUT
AT LEAST ONE PASSENGER, WHEN HOST VEHICLE
ENTERS LOCK STATE                                   ~S810

PERFORM, BY ALARM DEVICE, VISUAL AND AUDIBLE
ALARM FUNCTION, WHEN INFORMATION ABOUT AT LEAST
ONE PASSENGER MEETS SPECIFIED CONDITION             ~S820

COLLECT, BY INFORMATION COLLECTION DEVICE,
INFORMATION ABOUT HOST VEHICLE AND USER,
WHEN INFORMATION ABOUT AT LEAST ONE PASSENGER
MEETS SPECIFIED CONDITION                           ~S830

IDENTIFY AND PROVIDE, BY ACTION DETERMINATION
AND CONTROL DEVICE, AT LEAST ONE ACTION ITEM
ABOUT CONTROL OF HOST VHEICLE TO USER, BASED ON
AT LEAST ONE OF INFORMATON ABOUT AT LEAST ONE
PASSENGER, INFORMATION ABOUT HOST VEHICLE,
INFORMATION ABOUT USER, OR COMBINATION THEREOF      ~S840

END

FIG.8

REAR SEAT PASSENGER NOTIFICATION DEVICE AND A METHOD THEREFOR

CROSS-REFERENCE TO RELATED APPLICATION

This application claims the benefit of and priority to Korean Patent Application No. 10-2022-0142989, filed on Oct. 31, 2022, the entire contents of which are incorporated herein by reference.

TECHNICAL FIELD

The present disclosure relates to a rear seat passenger notification device and a method therefor.

BACKGROUND

Situations in which a user of a host vehicle leaves children in the host vehicle due to lack of attention or unavoidable circumstances often occur. Such situations may cause major problems, especially during summer months.

For example, children and the like may suffocate due to an increase in the interior temperature of the host vehicle if the children are left in the interior of the host vehicle for a long time. Because accidents of this type are not intended by the user of the host vehicle and are generally caused by momentary negligence and a moment of carelessness, most accidents may be prevented when an alarm is provided under certain conditions.

Many technologies have been proposed to cope with dangerous accidents in the parked host vehicle. For example, technologies of measuring the interior temperature of the host vehicle to open a window of a door of the host vehicle, operate an air conditioner of the host vehicle, or generate an alarm are provided in the host vehicle when the host vehicle is manufactured.

However, because the functions uniformly control the interior environment without considering the location of the user of the host vehicle or information about the exterior environment, there may be a risk of malfunction. Furthermore, because the accuracy of an interior detection process for providing a function may be degraded or it may be difficult to determine whether to execute various functions to be adaptive to the user, availability is slightly reduced.

SUMMARY

The present disclosure has been made to solve the above-mentioned problems occurring in the prior art while advantages achieved by the prior art are maintained intact.

An aspect of the present disclosure provides a rear seat passenger notification device for identifying information about an interior and/or exterior environment of a host vehicle using a sensor device and adaptively identifying an action item for safety of a passenger based on the identified result, and a method therefor.

Another aspect of the present disclosure provides a rear seat passenger notification device for visually and/or audibly providing an alarm function for a remaining situation of a passenger using an alarm device and further considering a separation distance between the host vehicle and the user to provide an alarm function in various manners, and a method therefor.

Another aspect of the present disclosure provides a rear seat passenger notification device for collecting at least one of information about the host vehicle, information of the user of the host vehicle, or a combination thereof in a complex manner using an information collection device and suitably identifying and providing an action item using the collected information, and a method therefor.

The technical problems to be solved by the present disclosure are not limited to the aforementioned problems, and any other technical problems not mentioned herein will be clearly understood from the following description by those having ordinary skill in the art to which the present disclosure pertains.

According to an embodiment of the present disclosure, a rear seat passenger notification device may include a sensor device configured to identify information about at least one passenger who is present in a host vehicle when the host vehicle enters a locked state. In particular, the information includes at least one of a location where the at least one passenger is seated, a state where the at least one passenger is seated, an age group of the at least one passenger, or a combination thereof. The rear seat passenger notification device may also include an alarm device configured to perform a visual and audible alarm function when it is identified that the information about the at least one passenger meets a specified condition, and an information collection device configured to collect information about the host vehicle and information about a user of the host vehicle when it is identified that the information about the at least one passenger meets the specified condition. The rear seat passenger notification device may further include an action determination and control device configured to identify, based on at least one of the information about the at least one passenger, the information about the host vehicle, the information about the user, or a combination thereof, at least one action item for control of the host vehicle, and the action determination and control device provide the user with the at least one action item.

In an aspect, the alarm device may be configured to perform the visual and audible alarm function when it is identified, based on whether at least one of a detection area, a detection intensity, a detection height, or a combination thereof included in the specified condition is met, that the at least one passenger includes a child.

In an aspect, the information collection device may be configured to collect a separation distance between the user and the host vehicle when it is identified, based on whether at least one of a detection area, a detection intensity, a detection height, or a combination thereof included in the specified condition is met, that the at least one passenger includes a child. In an example, the alarm device may be configured to gradually strengthen and repeatedly perform the visual and audible alarm function when it is identified that the separation distance is less than a specified distance.

In an aspect, the information collection device may be configured to collect a separation distance between the user and the host vehicle when it is identified, based on whether at least one of a detection area, a detection intensity, a detection height, or a combination thereof included in the specified condition is met, that the at least one passenger includes a child. In an example, the action determination and control device may be configured to transmit a user interface including the at least one action item for the control of the host vehicle to a terminal of the user when it is identified that the separation distance is greater than a specified distance.

In an aspect, the at least one action item may include at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

In an aspect, the action determination and control device may be configured to execute one of control of air conditioning of the host vehicle, control of at least one window of the host vehicle, control of at least one door of the host vehicle, or a combination thereof such that an interior temperature of the host vehicle, the interior temperature being in included in the information of the host vehicle, decreases when it is identified that the interior temperature is greater than or equal to a first temperature. The action determination and control device may also be configured to execute one of the control of air conditioning of the host vehicle, the control of the at least one window of the host vehicle, the control of the at least one door of the host vehicle, or the combination thereof such that the interior temperature of the host vehicle, the interior temperature being in included in the information of the host vehicle, increases when it is identified that the interior temperature is less than a second temperature lower than the first temperature.

In an aspect, the action determination and control device may be configured to transmit a digital key of the host vehicle to a terminal of an external user adjacent to the host vehicle, when presence of the external user is identified by means of adjacent information of the host vehicle. The adjacent information is included in the information of the host vehicle. In an aspect, the sensor device may divide the interior of the host vehicle into a plurality of areas based on a field of view (FOV) of at least one sensor included in the sensor device and identifies information of the at least one passenger with respect to each of the plurality of areas. In an example, the action determination and control device may identify the location where the at least one passenger is seated among the plurality of areas and may provide the user with the at least one action item to execute at least one of air conditioning control, window control, door control, or a combination thereof in an area adjacent to the location.

In an aspect, the sensor device may be configured to identify that an external user adjacent to the host vehicle approaches the host vehicle using at least one camera. In an example, the action determination and control device may be configured to continue setting all doors of the host vehicle to the lock state and transmits information about the external user to a terminal of the user.

In an aspect, the sensor device may include at least one camera that captures an area in front of the host vehicle, an area behind the host vehicle, and an area at a side of the host vehicle and at least one rear occupant alert (ROA) sensor that divides and identifies the interior of the host vehicle into a plurality of areas for each sitting seat.

According to another embodiment of the present disclosure, a rear seat passenger notification method may include identifying, by a sensor device, information about at least one passenger who exists in the host vehicle, the information including at least one of a location where the at least one passenger is seated, a state where the at least one passenger is seated, an age group of the at least one passenger, or a combination thereof, when the host vehicle enters a lock state. The rear seat passenger notification method may also include performing, by an alarm device, a visual and audible alarm function when it is identified that the information about the at least one passenger meets a specified condition, and collecting, by an information collection device, information about the host vehicle and information about a user of the host vehicle when it is identified that the information about the at least one passenger meets the specified condition. The rear seat passenger notification method may further include identifying, by an action determination and control device, at least one action item for control of the host vehicle based on at least one of the information about the at least one passenger, the information about the host vehicle, the information about the user, or a combination thereof. The rear seat passenger notification method may further include providing, by the action determination and control device, the user with the at least one action item.

In an aspect, performing the visual and audible alarm function by the alarm device may include performing the visual and audible alarm function when it is identified that the at least one passenger includes a child based on whether at least one of a detection area, a detection intensity, a detection height, or a combination thereof included in the specified condition is met.

In an aspect, collecting the information by the information collection device may include collecting a separation distance between the user and the host vehicle when it is identified, based on whether at least one of a detection area, a detection intensity, a detection height, or a combination thereof included in the specified condition is met, that the at least one passenger includes a child. In another embodiment, performing the visual and audible alarm function by the alarm device may include gradually strengthening and repeatedly performing, by the alarm device, the visual and audible alarm function when it is identified that the separation distance is less than a specified distance.

In an aspect, collecting the information by the information collection device may include collecting a separation distance between the user and the host vehicle when it is identified that the at least one passenger includes a child based on whether at least one of a detection area, a detection intensity, a detection height, or a combination thereof included in the specified condition is met. In an embodiment, providing the at least one action item to the user by the action determination and control device may include transmitting, by the action determination and control device, a user interface including the at least one action item for the control of the host vehicle to a terminal of the user when it is identified that the separation distance is greater than a specified distance.

In an aspect, the at least one action item may include at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

In an aspect, providing the at least one action item to the user by the action determination and control device may include executing, by the action determination and control device, one of control of air conditioning of the host vehicle, control of at least one window of the host vehicle, control of at least one door of the host vehicle, or a combination thereof such that an interior temperature of the host vehicle, the interior temperature being in included in the information of the host vehicle, decreases when it is identified that the interior temperature is greater than or equal to a first temperature. Providing the at least one action item to the user by the action determination and control device may also include executing, by the action determination and control device, one of the control of the air conditioning of the host vehicle, the control of the at least one window of the host vehicle, the control of the at least one door of the host vehicle, or the combination thereof such that the interior temperature of the host vehicle, the interior temperature being in included in the information of the host vehicle, increases when it is identified that the interior temperature is less than a second temperature lower than the first temperature.

In an aspect, providing the at least one action item to the user by the action determination and control device may include transmitting, by the action determination and control device, a digital key of the host vehicle to a terminal of an external user adjacent to the host vehicle, when presence of the external user is identified by means of adjacent information of the host vehicle. The adjacent information is included in the information of the host vehicle.

In an aspect, identifying the information about the at least one passenger by the sensor device may include dividing, by the sensor device, the interior of the host vehicle into a plurality of areas based on a field of view (FOV) of at least one sensor included in the sensor device and identifying, by the sensor device, information of the at least one passenger with respect to each of the plurality of areas. In an embodiment, providing the at least one action item to the user by the action determination and control device may include identifying, by the action determination and control device, the location where the at least one passenger is seated among the plurality of areas, and providing, by the action determination and control device, the user with the at least one action item to execute at least one of air conditioning control, window control, door control, or a combination thereof in an area adjacent to the location.

In an aspect, identifying the information about the at least one passenger by the sensor device may include identifying, by the sensor device, that an external user adjacent to the host vehicle approaches the host vehicle using at least one camera. In an embodiment, providing the at least one action item to the user by the action determination and control device may include continuing, by the action determination and control device, setting all doors of the host vehicle to the lock state, and transmitting, by the action determination and control device, information about the external user to a terminal of the user.

In an aspect, the sensor device may include at least one camera that captures an area in front of the host vehicle, an area behind the host vehicle, and an area at a side of the host vehicle and at least one rear occupant alert (ROA) sensor that divides and identifies the interior of the host vehicle into a plurality of areas for each sitting seat.

BRIEF DESCRIPTION OF THE DRAWINGS

The above and other objects, features and advantages of the present disclosure may be more apparent from the following detailed description taken in conjunction with the accompanying drawings, in which:

FIG. 1 is a block diagram illustrating components of a rear seat passenger notification device according to an embodiment of the present disclosure;

FIG. 8 is a flowchart depicting operations that may be performed by a rear seat passenger notification device according to an embodiment of the present disclosure.

Figure 2:
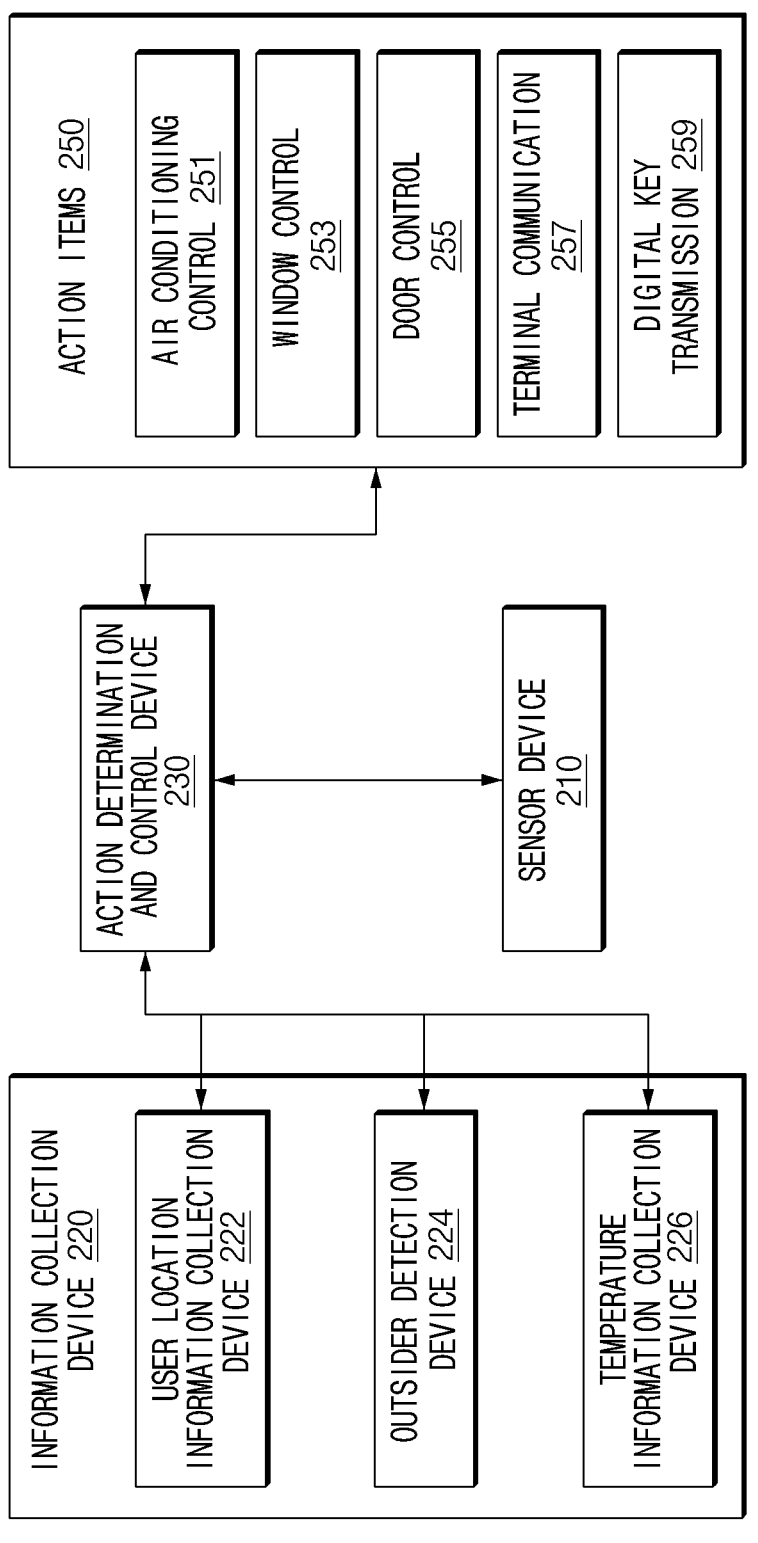
FIG. 2 is a conceptual diagram of an operation of a rear seat passenger notification device according to an embodiment of the present disclosure.

With regard to description of drawings, the same or similar denotations may be used for the same or similar components.

DETAILED DESCRIPTION

Hereinafter, embodiments of the present disclosure are described in detail with reference to the accompanying drawings. In the accompanying drawings, the same reference numerals are used throughout to designate the same or similar elements. In addition, a detailed description of well-known features or functions may be omitted in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

When a component, device, element, or the like of the present disclosure is described as having a purpose or performing an operation, function, or the like, the component, device, or element should be considered herein as being "configured to" meet that purpose or perform that operation or function.

Hereinafter, embodiments of the present disclosure are described in detail with reference to FIGS. 1 to 9.

FIG. 1 is a block diagram illustrating components of a rear seat passenger notification device according to an embodiment of the present disclosure.

Referring to FIG. 1, a rear seat passenger notification device 100 according to an embodiment of the present disclosure may be implemented in a vehicle. For example, the rear seat passenger notification device 100 may be integrally configured with control units in the vehicle or may be implemented as a separate device to be connected with the control units of the vehicle by a separate connection means.

According to an embodiment, the rear seat passenger notification device 100 may include a sensor device 110, an alarm device 120, an information collection device 130, and an action determination and control device 140. The components of the rear seat passenger notification device 100, which are shown in FIG. 1, are illustrative, and embodiments of the present disclosure are not limited thereto. For example, the rear seat passenger notification device 100 may further include components not shown in FIG. 1.

According to an embodiment, the sensor device 110 may include a plurality of sensors which obtain various pieces of information about the interior and/or exterior of a host vehicle.

The sensor device 110 may obtain various pieces of interior information of the host vehicle. For example, when the host vehicle enters a lock state, the sensor device 110 may identify information about at least one passenger who is present in the host vehicle. The information about the at least on passenger who is present in the host vehicle may include at least one of a location where the at least one passenger is seated, a state where the at least one passenger is seated, an age group of the at least one passenger, or a combination thereof.

The sensor device 110 may separately identify each of a plurality of areas logically divided in the interior of the host vehicle. For example, the sensor device 110 may include at least one rear occupant alert (ROA) sensor that divides and identifies the interior of the host vehicle into a plurality of areas for each sitting seat. The sensor device 110 may divide the interior of the host vehicle into the plurality of areas based on a field of view (FOV) of at least one sensor included in the sensor device 110 and may identify information about the at least one passenger with respect to each of the plurality of areas.

In an embodiment, the sensor device 110 may include at least one camera that obtains exterior information of the host vehicle. The at least one camera may capture an area in front of the host vehicle, an area behind the host vehicle, and an area at a side of the host vehicle to obtain exterior information about the host vehicle. For example, the sensor device 110 may identify that an external user adjacent to the host vehicle approaches the host vehicle using the at least one camera.

According to an embodiment, the alarm device 120 may perform various types of alarm functions.

For example, the alarm device 120 may perform a visual alarm function using headlights of the host vehicle.

As another example, the alarm device 120 may perform an audible alarm function using a speaker of the host vehicle.

In an example, when it is identified that the information about the at least one passenger meets a specified condition, the alarm device 120 may perform a visual and audible alarm function. The specified condition may include at least one of a detection area, a detection intensity, a detection height, or a combination thereof. The visual and audible alarm function may be defined as an alarm function including at least one of a visual alarm function, an audible alarm function, or a combination thereof. For example, the alarm device 120 may perform the visual and audible alarm function when it is identified that the at least one passenger includes a child based on whether at least one of the detection area, the detection intensity, the detection height, or the combination thereof included in the specified condition is met. As used herein, "child" may include an infant, a toddler, or a kid who is a little older (e.g., age between 5 and 66 months).

In an example, when it is identified that a separation distance between the user and the host vehicle is less than a specified distance, the alarm device 120 may gradually strengthen and repeatedly perform the visual and audible alarm function. The rear seat passenger notification device 100 may identify the separation distance between the user and the host vehicle based on wireless communication with a terminal of the user. The specified distance may be a predetermined distance or a setting value changeable by control of the user. For example, when the separation distance is less than 10 m, the rear seat passenger notification device 100 may gradually strengthen and repeatedly perform the visual and audible alarm function using the alarm device 120. The above-mentioned separation distance is a numerical example, and embodiments of the present disclosure are not limited thereto.

According to an embodiment, the information collection device 130 may collect various pieces of information about the host vehicle and/or the user.

For example, when it is identified that the information about the at least one passenger meets the specified condition, the information collection device 130 may collect information about the host vehicle and/or information about the user of the host vehicle.

In an embodiment, when it is identified that the at least one passenger includes a child based on whether at least one of the detection area, the detection intensity, the detection height, or the combination thereof included in the specified condition is met, the information collection device 130 may collect the separation distance between the user and the host vehicle. As an example, the information collection device 130 may collect the separation distance between the host vehicle and the user based on wireless communication with the user. As another embodiment, the information collection device 130 may collect location information of the user based on wireless communication with the user. As yet another embodiment, the information collection device 130 may collect interior temperature information of the host vehicle using at least one sensor included in the sensor device 110. As still another embodiment, the information collection device 130 may collect location information of the host vehicle using a global positioning system (GPS).

According to an embodiment, the action determination and control device 140 may identify and provide an action item to the user.

For example, the action determination and control device 140 may identify, based on at least one of the information about the at least one passenger, the information about the host vehicle, the information about the user, or the combination thereof, at least one action item for control of the host vehicle, and may provide the user with the at least one action item. The at least one action item may include at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

In an embodiment, when it is identified that the separation distance between the user and the host vehicle is greater than the specified distance (e.g., 10 m), the action determination and control device 140 may transmit a user interface including at least one action item for control of the host vehicle to the terminal of the user. The user interface may include, for example, application screen information to execute at least one of control of air conditioning of the host vehicle, control of starting of the host vehicle, control of at least one window of the host vehicle, control of at least one door of the host vehicle, digital key transmission, or a combination thereof.

In an embodiment, when the interior temperature of the host vehicle is greater than or equal to or is less than a specified value, the action determination and control device 140 may provide the user with a function for adjusting the interior temperature.

In an embodiment, when it is identified that the interior temperature included in the information of the host vehicle is greater than or equal to a first temperature, the action determination and control device 140 may execute one of the control of the air conditioning of the host vehicle, the control of the at least one window of the host vehicle, the control of the at least one door of the host vehicle, or the combination thereof, and may provide the user with a control function, such that the interior temperature decreases.

On the other hand, when it is identified that the interior temperature included in the information of the host vehicle is less than a second temperature lower than the first temperature, the action determination and control device 140 may execute one of the control of the air conditioning of the host vehicle, the control of the at least one window of the host vehicle, the control of the at least one door of the host vehicle, or the combination thereof and may provide the user with the control function, such that the interior temperature increases.

In an embodiment, when it is identified, by means of adjacent information that is included in the information about the host vehicle, that an external user is present adjacent to the host vehicle, the action determination and control device 140 may transmit a digital key of the host vehicle to the terminal of the external user. The identified external user may be an outsider who may provide cooperation for at least one passenger left in the host vehicle. Thus, the action determination and control device 140 may transmit the digital key of the host vehicle to the terminal of the external user and may hand over control authority of the host vehicle to the external user.

In an embodiment, the action determination and control device 140 may identify a location where the at least one passenger is seated among the plurality of areas in the interior of the host vehicle and may provide the user with at least one action item to execute at least one of air conditioning control, window control, door control, or a combination thereof in an area adjacent to the location.

In an embodiment, when it is identified that the external user adjacent to the host vehicle approaches the host vehicle, the action determination and control device 140 may preemptively continue setting all doors of the host vehicle to a lock state and may transmit information about the external user to the terminal of the user The external user identified as approaching the host vehicle may be, for example, a trespasser on the host vehicle. Thus, the action determination and control device 140 may identify the external user as the trespasser, may strengthen security of the host vehicle (e.g., set all the doors to the lock state), and may transmit information about the external user to the terminal of the user of the host vehicle.

FIG. 2 is a conceptual diagram of an operation of a rear seat passenger notification device according to an embodiment of the present disclosure.

According to an embodiment, a rear seat passenger notification device (e.g., the rear seat passenger notification device 100 of FIG. 1) may include a sensor device 210 (e.g., the sensor device 110 of FIG. 1), an information collection device 220 (e.g., the information collection device 130 of FIG. 1), and an action determination and control device 230 (e.g., the action determination and control device 140 of FIG. 1). The action determination and control device 230 may control the sensor device 210 and the information collection device 220.

In an embodiment, the action determination and control device 230 may obtain various pieces of information about the interior of the host vehicle using the sensor device 210.

In an embodiment, the sensor device 210 may identify at least one passenger who is present in the interior of the host vehicle based on control of the action determination and control device 230. The sensor device 210 may include, for example, at least one sensor (e.g., an ROA sensor) included in the interior of the host vehicle.

The sensor device 210 may identify whether at least one passenger is an adult or a child using the ROA sensor. As an example, the sensor device 210 may identify whether the at least one passenger is the adult or the child using at least one of an area where the detected passenger is detected, intensity (e.g., a signal to noise ratio (SNR)) where the detected passenger is detected, a height where the detected passenger is detected, a location where breathing of the detected passenger occurs, or a combination thereof.

In an embodiment, the sensor device 210 may identify at least one passenger for each of a plurality of areas logically divided in the interior of the host vehicle.

In an embodiment, the action determination and control device 230 may obtain various pieces of information about the host vehicle, a user, and/or an outsider using the information collection device 220.

In an embodiment, the information collection device 220 may include a user location information collection device 222. The user location information collection device 222 may collect a location of the user based on wireless communication with a user terminal.

The information collection device 220 may include an outsider detection device 224. The outsider detection device 224 may identify an outsider adjacent to the host vehicle using at least one of a biometric sensor, a motion sensor, an acceleration sensor, or a combination thereof. In an embodiment, the outsider detection device 224 may separately identify an outsider adjacent to the host vehicle and/or an outsider who gradually approaches the host vehicle.

In an embodiment, the information collection device 220 may collect an interior temperature of the host vehicle using a temperature information collection device 226. The temperature information collection device 226 may identify the interior temperature of the host vehicle. The temperature information collection device 226 may identify whether the interior temperature of the host vehicle is greater than or equal to a specified value or is less than the specified value. In an embodiment, when it is identified that the interior temperature of the host vehicle is greater than or equal to a first temperature, the temperature information collection device 226 may deliver a signal that it is required to decrease the interior temperature to the action determination and control device 230. On the other hand, when it is identified that the interior temperature of the host vehicle is less than a second temperature lower than the first temperature, the temperature information collection device 226 may deliver a signal that it is required to increase the interior temperature to the action determination and control device 230.

According to an embodiment, the action determination and control device 230 may identify at least one of action items 250 based on the various pieces of information obtained by means of the sensor device 210 and/or the information collection device 220.

The action items 250 may include air conditioning control 251, window control 253, door control 255, terminal communication 257, and/or digital key transmission 259.

The air conditioning control 251 may include a control function of at least one air conditioning device (e.g., at least one of an air conditioner, a heater, an inner air circulation device, a dehumidifier, or a combination thereof) in the interior of the host vehicle.

The window control 253 may include an opening and closing control function of at least one window of the host vehicle. The user may control an opening and closing state of the window by means of the window control 253. For example, the user may completely close or open a window of the host vehicle by means of the window control 253 or may open the window of the host vehicle by a specified degree (e.g., 30%) by means of the window control 253.

The door control 255 may include an opening and closing control function of at least one door of the host vehicle. The user may selectively set at least one door of the host vehicle to a lock state by means of the door control 255.

The terminal communication 257 may include various data transmission and reception functions through communication with an external device (e.g., a terminal). The user may transmit and receive pieces of data associated with the action items 250 of the host vehicle to a terminal of the user and/or a terminal of the external user by means of the terminal communication 257.

The digital key transmission 259 may include a function of transmitting a digital key including control authority of the host vehicle to the external device (e.g., the terminal). When it is difficult for the user to immediately approach the host vehicle, the user may transmit a digital key to a terminal of the external user who is adjacent to the host vehicle and is capable of cooperating with a passenger of the host vehicle.

Figure 3:
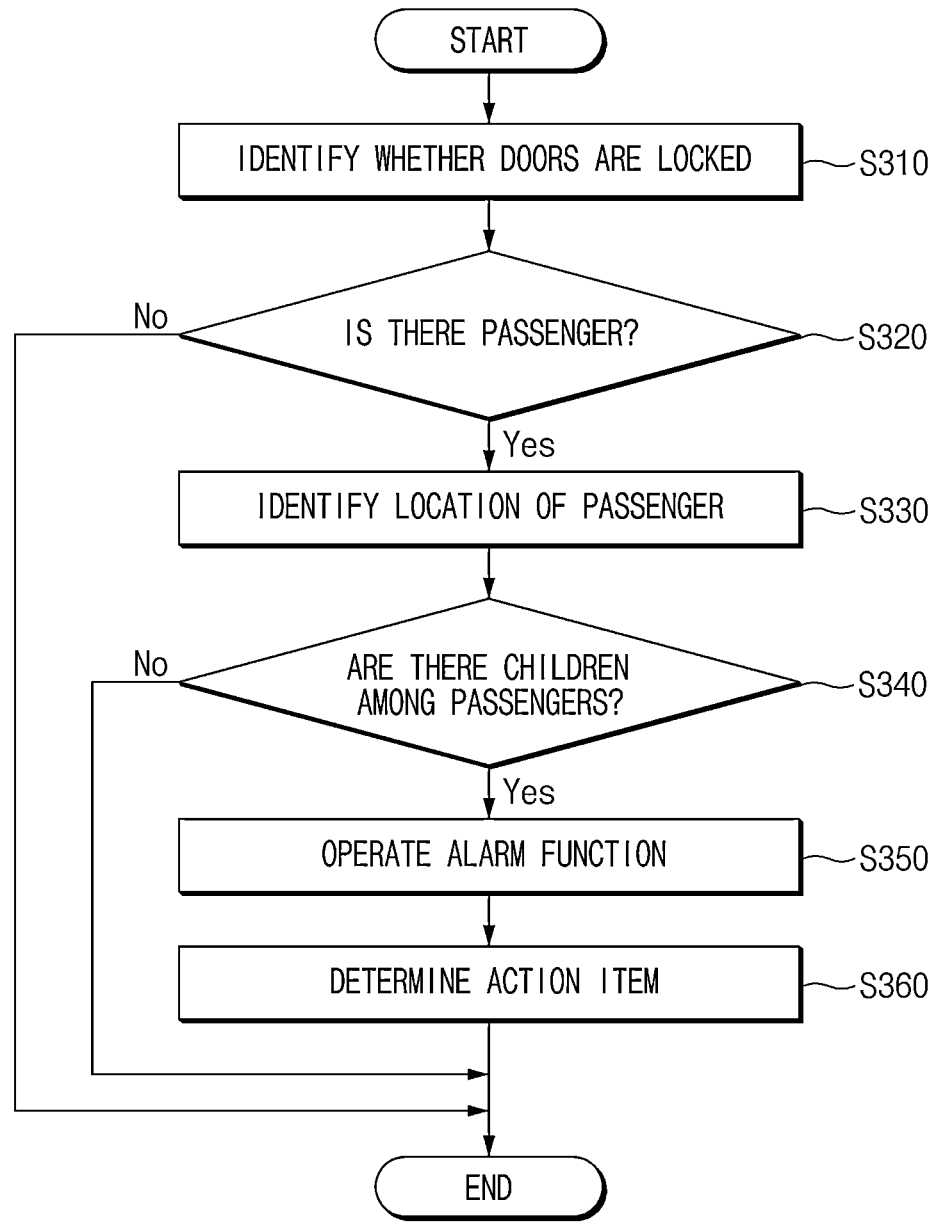
FIG. 3 is a flowchart depicting operations that may be performed by a rear seat passenger notification device according to an embodiment of the present disclosure.

FIG. 3 is a flowchart depicting operation of a rear seat passenger notification device according to an embodiment of the present disclosure.

According to an embodiment, a rear seat passenger notification device (e.g., the rear seat passenger notification device 100 of FIG. 1) may perform operations depicted in FIG. 3. For example, at least some of components (e.g., the sensor device 110, the alarm device 120, the information collection device 130, and the action determination and control device 140) included in the rear seat passenger notification device may be configured to perform the operations of FIG. 3.

Operations S310 to S360 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 3, may be briefly described or omitted.

In an operation S310, the rear seat passenger notification device may identify whether doors are locked.

For example, the rear seat passenger notification device may identify whether doors of a host vehicle correspond to a lock state.

In an operation S320, the rear seat passenger notification device may identify whether there is at least one passenger in the interior of the host vehicle.

For example, the rear seat passenger notification device may identify whether there is at least one passenger in the interior (e.g., rear seat) of the host vehicle. In an example, the rear seat passenger notification device may identify whether there is at least one passenger in one of a plurality of areas logically divided in the interior of the host vehicle, using a sensor device.

In an embodiment, when it is identified that there is the passenger (e.g., —"Yes" in the operation S320), the rear seat passenger notification device may perform operation S330.

On the other hand, when it is identified that there is no passenger (e.g., —"No" in the operation S320), the rear seat passenger notification device may end the operation.

In an operation S330, the rear seat passenger notification device may identify a location of the passenger. In an embodiment, the rear seat passenger notification device may identify a location (e.g., the driver's seat, a passenger seat, or a rear seat corresponding to the driver's seat or the passenger seat) using a plurality of sensors included in the interior of the host vehicle.

In an operation S340, the rear seat passenger notification device may identify whether there is a child among the at least one passenger in the host vehicle.

For example, the rear seat passenger notification device may identify whether there are adults or children using at least one of an area where at least one passenger is detected, intensity where the at least one passenger is detected, a height where the at least one passenger is detected, or a combination thereof.

In an embodiment, when it is identified that there is a child among the at least one passenger (e.g., —"Yes" in the operation S340), the rear seat passenger notification device may perform operation S350.

On the other hand, when it is identified that there are no children among the at least one passenger (e.g., —"No" in the operation S340), the rear seat passenger notification device may end the operation.

In an operation S350, the rear seat passenger notification device may operate an alarm function.

For example, the rear seat passenger notification device may perform a visual alarm function using headlights of the host vehicle or may perform an audible alarm function using a speaker of the host vehicle.

In an example, when it is identified that the information about the at least one passenger meets a specified condition, the rear seat passenger notification device may perform the visual and audible alarm function. The specified condition may include at least one of a detection area, a detection intensity, a detection height, or a combination thereof. As an example, the visual and audible alarm function may be defined as an alarm function including at least one of a visual alarm function, an audible alarm function, or a combination thereof.

For example, when it is identified, based on whether at least one of the detection area, the detection intensity, the detection height, or the combination thereof included in the specified condition is met, that the at least one passenger includes a child, the rear seat passenger notification device may perform the visual and audible alarm function.

In an operation S360, the rear seat passenger notification device may determine an action item.

For example, after operating the alarm function, the rear seat passenger notification device may identify at least one action item for control of the host vehicle.

The at least one action item may include at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

In an example, the rear seat passenger notification device may identify at least one action item and may provide the user with the at least one action item.

Figure 4:
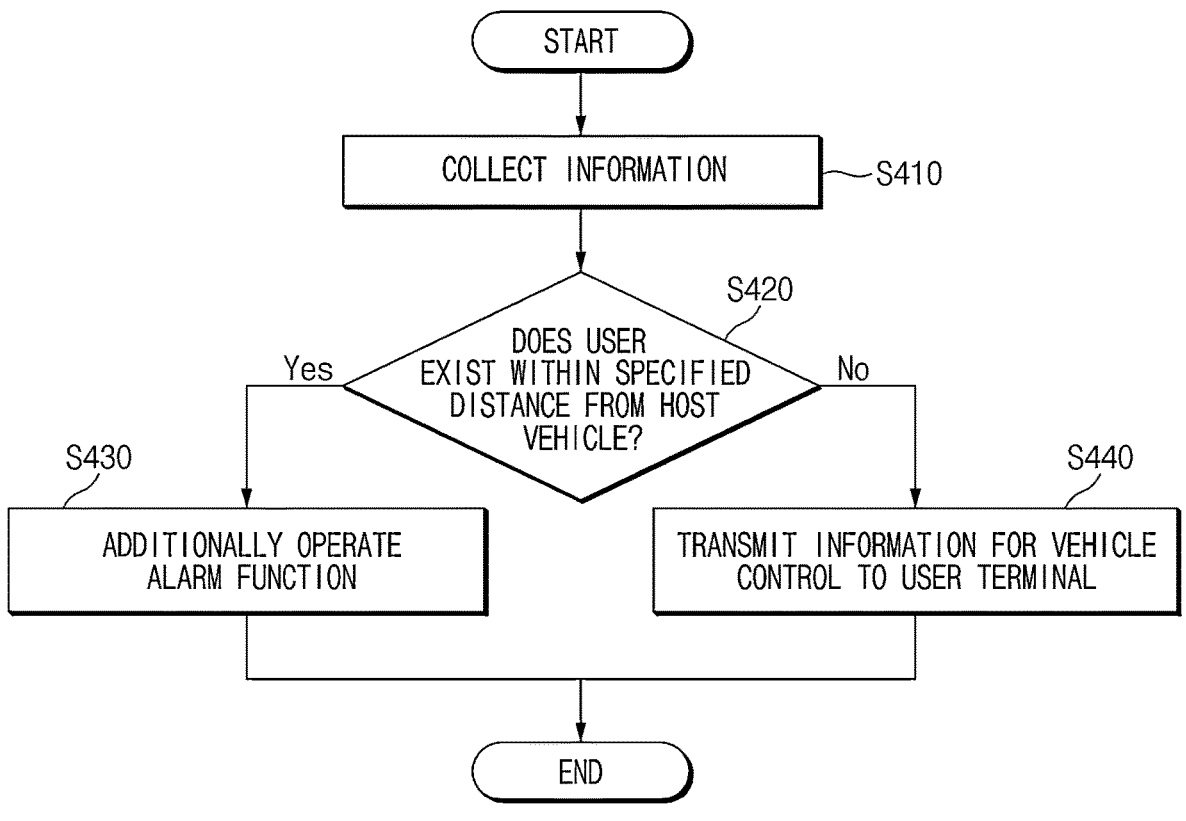
FIG. 4 is a flowchart depicting operations that may be performed by a rear seat passenger notification device according to another embodiment of the present disclosure.

FIG. 4 is a flowchart depicting operations that may be performed by a rear seat passenger notification device according to another embodiment of the present disclosure.

According to an embodiment, a rear seat passenger notification device (e.g., the rear seat passenger notification device 100 of FIG. 1) may perform operations depicted in FIG. 4. For example, at least some of components (e.g., the sensor device 110, the alarm device 120, the information collection device 130, and the action determination and control device 140 of FIG. 1) included in the rear seat passenger notification device may be configured to perform the operations of FIG. 4.

Operations S410 to S440 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 4, may be briefly described or omitted.

In an operation S410, the rear seat passenger notification device may collect information.

For example, the rear seat passenger notification device may collect information associated with at least one of a user, an outsider, or a combination thereof.

In various examples, the rear seat passenger notification device may collect location information of the user, information about the outsider who is adjacent to the host vehicle or approaches the host vehicle, and/or information about an interior temperature of the host vehicle.

In an operation S420, the rear seat passenger notification device may identify whether the user is within a specified distance from the host vehicle.

For example, the rear seat passenger notification device may identify location information of the user, and/or a separation distance between the user and the host vehicle, based on wireless communication with a terminal of the user.

In an embodiment, when it is identified that the separation distance between the user and the host vehicle is less than the specified distance (e.g., "Yes" in the operation S420), the rear seat passenger notification device may perform an operation S430.

On the other hand, when it is identified that the separation distance between the user and the host vehicle is greater than the specified distance (e.g., —"No" in the operation S420), the rear seat passenger notification device may perform an operation S440.

According to an embodiment, when it is identified that the separation distance between the user and the host vehicle is less than the specified distance, the rear seat passenger notification device may additionally operate an alarm function in the operation S430.

For example, the rear seat passenger notification device may gradually strengthen and repeatedly perform the visual and audible alarm function. In an example, the rear seat passenger notification device may identify the separation distance between the user and the host vehicle based on wireless communication with the terminal of the user. The specified distance may be a predetermined distance or a setting value changeable by control of the user. In an example, when the separation distance is less than 10 m, the rear seat passenger notification device may gradually strengthen and repeatedly perform the visual and audible alarm function using an alarm device. The above-mentioned separation distance is a numerical example, and embodiments of the present disclosure are not limited thereto.

In the operation S440, the rear seat passenger notification device may transmit information for vehicle control to the terminal of the user.

For example, the rear seat passenger notification device may transmit a user interface including at least one action item for control of the host vehicle to the terminal of the user. As an example, the user interface may include application screen information to execute at least one of control of air conditioning of the host vehicle, control of starting of the host vehicle, control of at least one window of the host vehicle, control of at least one door of the host vehicle, digital key transmission, or a combination thereof.

Figure 5:
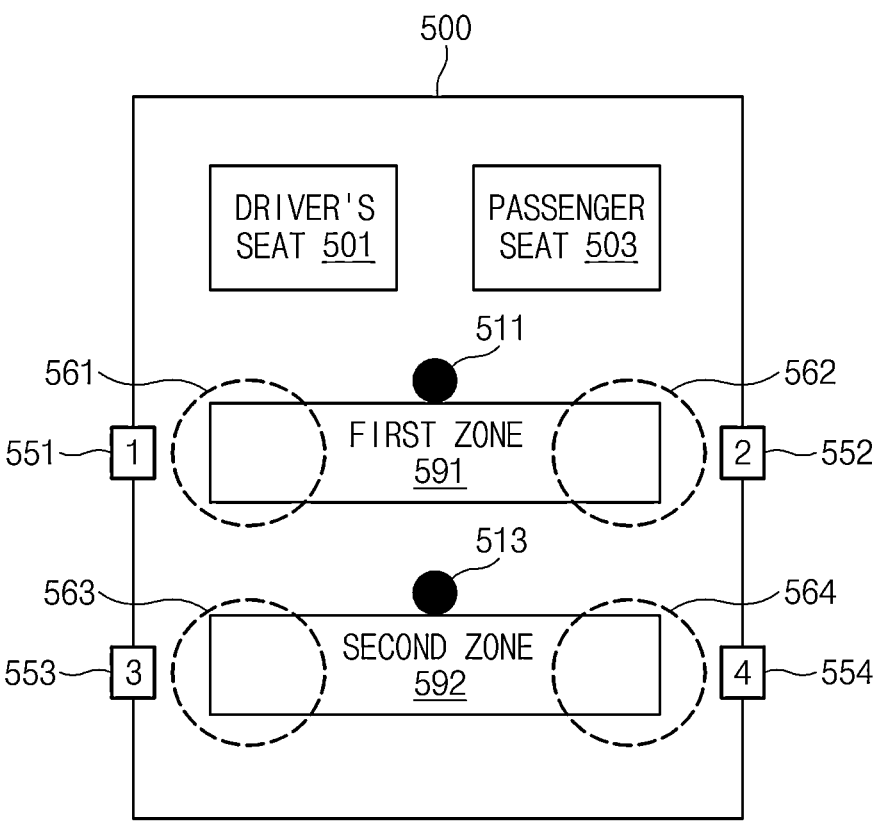
FIG. 5 is a conceptual diagram for dividing a host vehicle into a plurality of areas sensed by a sensor device, according to an embodiment of the present disclosure.

FIG. 5 is a conceptual diagram for dividing a host vehicle into a plurality of areas sensed by a sensor device, according to an embodiment of the present disclosure.

According to an embodiment, a host vehicle 500 may include a plurality of seats and zones in the interior.

For example, the host vehicle 500 may include front seats including a driver's seat 501 and a passenger seat 503 in the interior.

In an example, the host vehicle 500 may include rear seats including a first zone 591 and a second zone 592 in the interior.

In an example, a rear seat passenger notification device (e.g., the rear seat passenger notification device 100 of FIG. 1) may include a plurality of sensors (e.g., ROA sensors) which separately identify each of a plurality of areas.

For example, the rear seat passenger notification device may include a first sensor 511 disposed in an area adjacent to the first zone 591.

The first sensor 511 may separately identify information about at least one passenger who exists in each of a first area 561 and a second area 562 of the first zone 591.

The rear seat passenger notification device may include also a second sensor 513 disposed in an area adjacent to the second zone 592.

The second sensor 513 may separately identify information about at least one passenger who exists in each of a third area 563 and a fourth area 564 of the second zone 592.

According to an embodiment, the rear seat passenger notification device may provide a user with a function to selectively control components of the host vehicle 500 using the information about the at least one passenger that is obtained by the plurality of sensors.

For example, the rear seat passenger notification device may provide the user with a function to control a window adjacent to an area identified as including a child, among a first window 551, a second window 552, a third window 553, and a fourth window 554.

For example, when it is identified, by means of the first sensor 511, that a child is present in the first area 561, the rear seat passenger notification device may provide the user (or a terminal of the user) with a function to control opening and closing of the first window 551 adjacent to the first area 561.

The embodiment of controlling the opening and closing of the window is described in the above-mentioned example, but embodiments of the present disclosure are not limited thereto. For example, the rear seat passenger notification device may provide the user with a function to control opening and closing of a door adjacent to an area identified as including a child. As another example, the rear seat passenger notification device may provide the user with a function to control air conditioning of an area identified as including a child.

Figure 6:
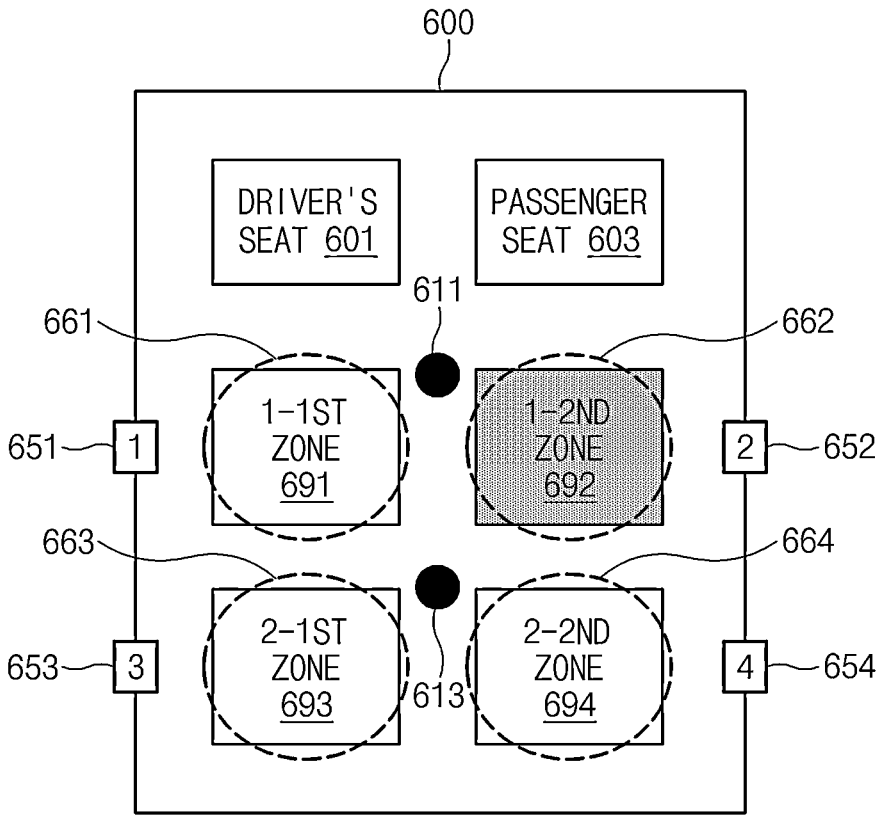
FIG. 6 is a conceptual diagram for dividing a host vehicle into a plurality of areas sensed by a sensor device, according to another embodiment of the present disclosure.

FIG. 6 is a conceptual diagram for dividing a host vehicle into a plurality of areas sensed by a sensor device, according to another embodiment of the present disclosure.

A description duplicated with the description of FIG. 5 in the description of FIG. 6 is replaced below with the above-mentioned description of FIG. 5.

According to an embodiment, a host vehicle 600 (e.g., the host vehicle 500 of FIG. 5) may include a plurality of seats and zones in the interior.

For example, the host vehicle 600 may include front seats including a driver's seat 601 and a passenger seat 603 in the interior.

In an example, the host vehicle 600 may include rear seats including a 1-1st zone 691, a 1-2nd zone 692, a 2-1st zone 693, and a 2-2nd zone 694 in the interior.

In an example, a rear seat passenger notification device (e.g., the rear seat passenger notification device 100 of FIG. 1) may include a plurality of sensors (e.g., ROA sensors) which separately identify each of a plurality of areas.

For example, the rear seat passenger notification device may include a first sensor 611 disposed in an area adjacent to the 1-1st zone 691 and the 1-2nd zone 692.

The first sensor 611 may separately identify information about at least one passenger who exists in each of a first area 661 included in the 1-1st zone 691 and a second area 662 included in 1-2nd zone 692.

The rear seat passenger notification device may also include a second sensor 613 disposed in an area adjacent to the 2-1st zone 693 and the 2-2 zone 694.

The second sensor 613 may separately identify information about at least one passenger who exists in each of a third area 663 of the 2-1st zone 693 and a fourth area 664 of the 2-2nd zone 694.

According to an embodiment, the rear seat passenger notification device may provide a user with a function to selectively control components of the host vehicle 600 using the information about the at least one passenger, which is obtained by the plurality of sensors.

For example, the rear seat passenger notification device may provide the user with a function to control a window adjacent to an area identified as including a child is, among a first window 651, a second window 652, a third window 653, and a fourth window 654.

In an example, when it is identified by means of the first sensor 611, that a child is present in the first area 661, the rear seat passenger notification device may provide the user (or a terminal of the user) with a function to control opening and closing of the first window 651 adjacent to the first area 661.

The embodiment of controlling the opening and closing of the window is described in the above-mentioned example, but embodiments of the present disclosure are not limited thereto. For example, the rear seat passenger notification device may provide the user with a function to control opening and closing of a door adjacent to an area identified as including a child. As another example, the rear seat passenger notification device may provide the user with a function to control air conditioning of an area identified as including a child.

Figure 7:
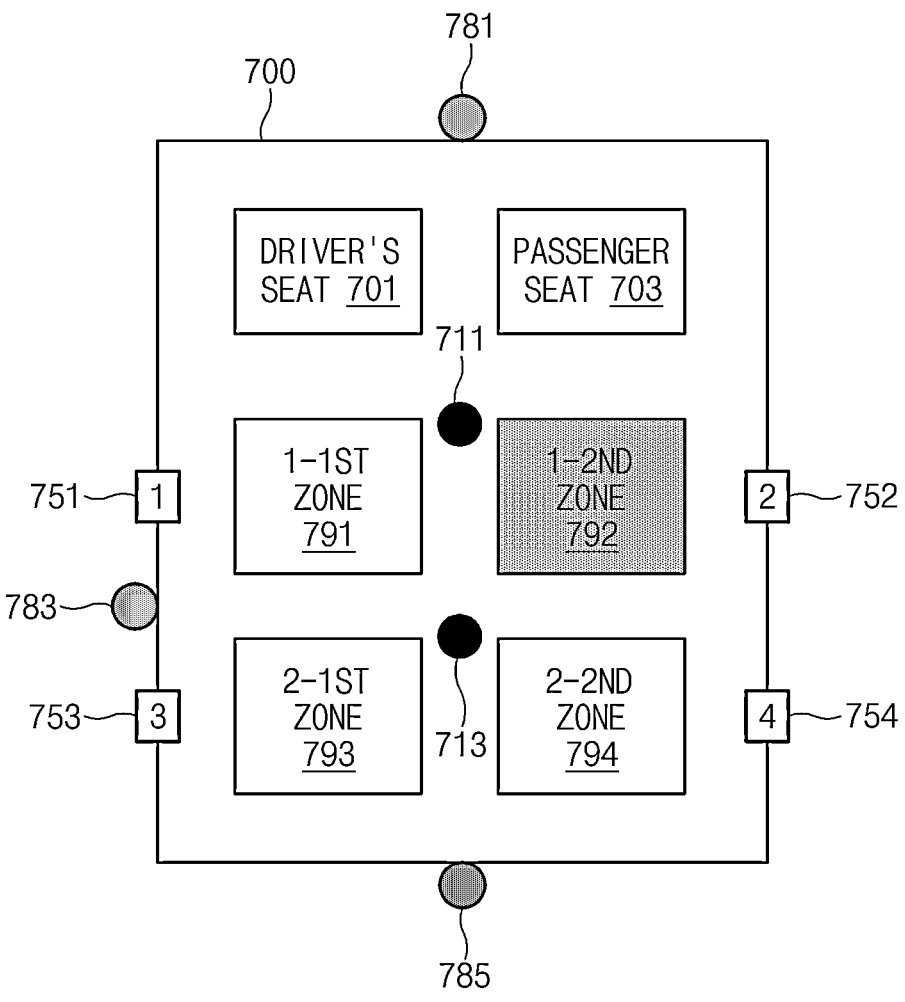
FIG. 7 is a conceptual diagram for dividing a host vehicle into a plurality of areas sensed by a sensor device, according to yet another embodiment of the present disclosure.

FIG. 7 is a conceptual diagram for dividing a host vehicle into a plurality of areas sensed by a sensor device, according to yet another embodiment of the present disclosure.

A description duplicated with the description of FIGS. 5 and 6 in the description of FIG. 7 is replaced below with the above-mentioned description of FIGS. 5 and 6.

According to an embodiment, a host vehicle 700 (e.g., the host vehicle 500 of FIG. 5 or the host vehicle 600 of FIG.

6) may include front seats including a driver's seat 701, a passenger seat 703, and rear seats including a 1-1st zone 791, a 1-2nd zone 792, a 2-1st zone 793, and a 2-2nd zone 794 in the interior.

In an example, a rear seat passenger notification device (e.g., the rear seat passenger notification device 100 of FIG. 1) may include a first sensor 711 and a second sensor 713, which separately identify each of a plurality of areas.

In an example, the rear seat passenger notification device may include at least one camera which identifies information about a front, a side, and a rear of the host vehicle 700. For example, the rear seat passenger notification device may include a front view camera 781, a side view camera 783, and a rear view camera 785.

According to an embodiment, the rear seat passenger notification device may provide a user with a function to selectively control components of the host vehicle 700 using exterior information of the host vehicle 700, which is obtained by the at least one camera.

For example, the rear seat passenger notification device may provide the user with a function to control a window corresponding to an external user adjacent to the host vehicle 700, among a first window 751, a second window 752, a third window 753, and a fourth window 754.

In an example, when it is identified, by means of the side view camera 783, that the external user (or a trespasser) approaches an area, of the host vehicle 700, that is adjacent to the 1-1st zone 791, the rear seat passenger notification device may close the first window 751 and may maintain a door corresponding to the first window 751 in a lock state.

In an example, when it is identified, by means of the side view camera 783, that the digital key including control authority of the host vehicle 700 is included in a terminal of the external user who approaches an area, of the host vehicle 700, that is adjacent to the 1-1st zone 791, the rear seat passenger notification device may open the first window 751 and may release the lock state of the door corresponding to the first window 751.

In an example, the rear seat passenger notification device may transmit information about the external user, which is obtained using the at least one camera, to the user terminal based on a specified period.

FIG. 8 is a flowchart depicting operations that may be performed by a rear seat passenger notification device according to an embodiment of the present disclosure.

According to an embodiment, a rear seat passenger notification device (e.g., the rear seat passenger notification device 100 of FIG. 1) may perform operations illustrated in FIG. 8. For example, at least some of components (e.g., the sensor device 110, the alarm device 120, the information collection device 130, and the action determination and control device 140 of FIG. 1) included in the rear seat passenger notification device may be configured to perform the operations of FIG. 8.

Operations S810 to S840 in an embodiment below may be sequentially performed, but are not necessarily sequentially performed. For example, an order of the respective operations may be changed, and at least two operations may be performed in parallel. Furthermore, contents, which correspond to or are duplicated with the contents described above in conjunction with FIG. 8, may be briefly described or omitted.

In an operation S810, when a host vehicle enters a lock state, a sensor device may identify information about at least one passenger in the host vehicle.

In an example, the sensor device may divide the interior of the host vehicle into a plurality of areas based on a field of view (FOV) of at least one sensor included in the sensor device and may identify information of at least one passenger with respect to each of the plurality of areas.

The sensor device may identify that an external user adjacent to the host vehicle approaches the host vehicle using at least one camera.

For example, the sensor device may include at least one camera that captures an area in front of the host vehicle, an area behind the host vehicle, and an area at a side of the host vehicle and at least one rear occupant alert (ROA) sensor which divides and identifies the interior of the host vehicle into a plurality of areas for each sitting seat.

In an operation S820, when it is identified that the information about the at least one passenger meets a specified condition, an alarm device may perform a visual and audible alarm function.

For example, when it is identified, based on whether at least one of a detection area, a detection intensity, a detection height, or a combination thereof included in the specified condition is met, that the at least one passenger includes a child, the alarm device may perform the visual and audible alarm function.

In an example, when it is identified that a separation distance between the user and the host vehicle is less than a specified distance, the alarm device may gradually strengthen and repeatedly perform the visual and audible alarm function.

In an operation S830, when it is identified that the information about the at least one passenger meets the specified condition, an information collection device may collect information about the host vehicle and information about the user of the host vehicle.

For example, when it is identified, based on whether at least one of the detection area, the detection intensity, the detection height, or the combination thereof included in the specified condition is met, that the at least one passenger includes a child, the information collection device may collect the separation distance between the user and the host vehicle.

In an operation S840, an action determination and control device may identify at least one action item for control of the host vehicle, based on at least one of information about the at least one passenger, information about the host vehicle, information about the user, or a combination thereof, and may provide the user with the at least one action item.

For example, when it is identified that the separation distance is greater than the specified distance, the action determination and control device may transmit a user interface including the at least one action item for the control of the host vehicle to a terminal of the user. The at least one action item may include, for example, at least one of control of air conditioning of the host vehicle, control of starting of the host vehicle, control of at least one window of the host vehicle, control of at least one door of the host vehicle, communication with the terminal of the user, digital key transmission to a terminal of an external user adjacent to the host vehicle, or a combination thereof.

In an example, when it is identified that the interior temperature included in the information of the host vehicle is greater than or equal to a first temperature, the action determination and control device may provide the user with a user interface to execute one of the control of the air conditioning of the host vehicle, the control of the at least one window of the host vehicle, the control of the at least one door of the host vehicle, or the combination thereof such that the interior temperature decreases. On the other hand, when it is identified that the interior temperature included in the information of the host vehicle is less than a second temperature low than the first temperature, the action determination and control device may provide the user with a user interface to execute one of the control of the air conditioning of the host vehicle, the control of the at least one window of the host vehicle, the control of the at least one door of the host vehicle, or the combination thereof such that the interior temperature increases.

In an example, when it is identified, by means of adjacent information included in the information of the host vehicle, that there is an external user adjacent to the host vehicle, the action determination and control device may transmit a digital key of the host vehicle to the terminal of the external user.

In an example, the action determination and control device may identify a location where the at least one passenger is seated among the plurality of areas and may provide the user with at least one action item to execute at least one of air conditioning control, window control, door control, or a combination thereof in an area adjacent to the location.

In an example, the action determination and control device may continue setting all doors of the host vehicle to a lock state and may transmit information about the external user to the terminal of the user.

Figure 9:
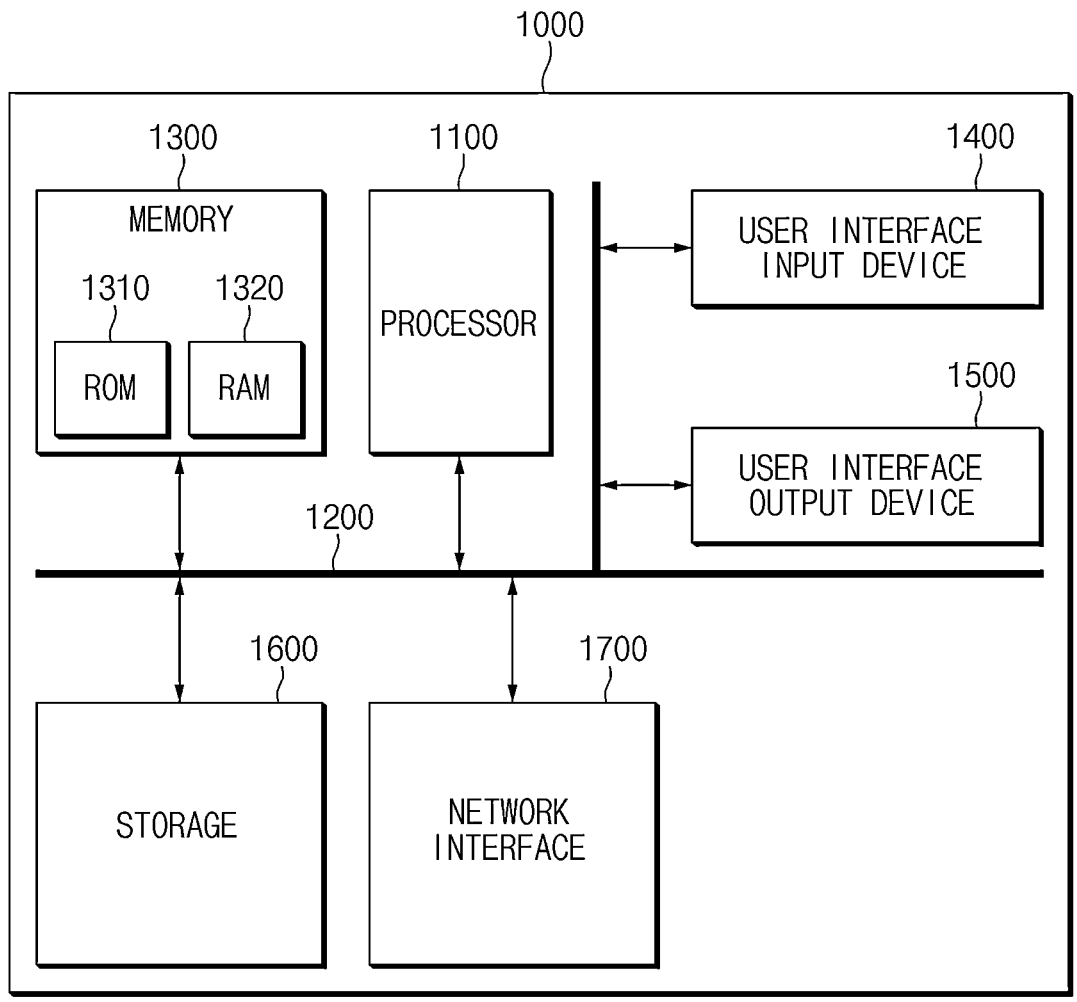
FIG. 9 is a block diagram illustrating a computing system according to an embodiment of the present disclosure.

FIG. 9 illustrates a computing system that may perform a rear seat passenger notification method according to an embodiment of the present disclosure.

Referring to FIG. 9, a computing system 1000 that may perform the rear seat passenger notification method may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (e.g., the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Various effects of a rear seat passenger notification device and a method therefor, according to at least some embodiments of the present disclosure, are provided below.

In at least one of embodiments of the present disclosure, a rear seat passenger notification device may selectively identify an action item required for a host vehicle using a plurality of sensors (e.g., at least one of a rear occupant alert (ROA) sensor, a camera, a combination thereof) included in a sensor device.

In at least some embodiments of the present disclosure, the rear seat passenger notification device may provide an efficient and safe rear seat passenger notification function as a user of the host vehicle selectively execute a visual and audible alarm function or executes the visual and audible alarm function in various modes, depending on a distance separated from the host vehicle.

In at least some embodiments of the present disclosure, the rear seat passenger notification device may collect an exterior and/or interior environment of the host vehicle in real time, when there is the user of the host vehicle at a distance relatively away from the host vehicle, and may provide a user interface about a control function of the host vehicle, which is suitable for the terminal of the user, thus increasing availability.

In at least some embodiments of the present disclosure, the rear seat passenger notification device may control the host vehicle such that an optimal control function is able to be executed for each area as the sensor device divides and senses the interior of the host vehicle into a plurality of areas depending on a sitting location or a sitting state.

In addition, various effects ascertained directly or indirectly through the present disclosure may be provided.

Hereinabove, although the present disclosure has been described with reference to example embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A rear seat passenger notification device, comprising:
a sensor device configured to:
identify information about at least one passenger who is present in a host vehicle when the host vehicle enters a lock state, the information including at least one of a location where the at least one passenger is seated, a state where the at least one passenger is seated, an age group of the at least one passenger, or a combination thereof, and
identify whether the at least one passenger is an adult or a child using at least one of a detection area where a detected passenger is detected, a detection intensity where the detected passenger is detected, a detection height where the detected passenger is detected, a location where breathing of the detected passenger occurs, or a combination thereof;
an alarm device configured to perform a visual and audible alarm function including at least one of a visual alarm function, an audible alarm function, or a combination thereof, when it is identified that the information about the at least one passenger meets a specified condition including at least one of the detection area, the detection intensity, the detection height, or a combination thereof;
an information collection device configured to collect information about the host vehicle and information about a user of the host vehicle when it is identified that the information about the at least one passenger meets the specified condition; and
an action determination and control device configured to:
identify, based on at least one of the information about the at least one passenger, the information about the host vehicle, the information about the user, or a combination thereof, at least one action item for control of the host vehicle, and
provide the user with the at least one action item, wherein the action determination and control device is configured to provide the user with a function to control a window adjacent to an area identified as including the child,
wherein the information collection device includes:
a user location information collection device configured to collect a location of the user based on wireless communication with a user terminal, and
an outsider detection device configured to identify an outsider adjacent to the host vehicle using at least one of a biometric sensor, a motion sensor, an acceleration sensor, or a combination thereof.

2. The rear seat passenger notification device of claim 1, wherein the alarm device is configured to perform the visual and audible alarm function when it is identified, based on whether at least one of the detection area, the detection intensity, the detection height, or a combination thereof included in the specified condition is met, that the at least one passenger includes the child.

3. The rear seat passenger notification device of claim 1, wherein:
the information collection device is configured to collect a separation distance between the user and the host vehicle when it is identified, based on whether at least one of the detection area, the detection intensity, the detection height, or a combination thereof included in the specified condition is met, that the at least one passenger includes the child, and
the alarm device is configured to gradually strengthen and repeatedly perform the visual and audible alarm function when it is identified that the separation distance is less than a specified distance.

4. The rear seat passenger notification device of claim 1, wherein:
the information collection device is configured to collect a separation distance between the user and the host vehicle when it is identified, based on whether at least one of the detection area, the detection intensity, the detection height, or a combination thereof included in the specified condition is met, that the at least one passenger includes the child, and
the action determination and control device is configured to transmit a user interface including the at least one action item for the control of the host vehicle to a terminal of the user when it is identified that the separation distance is greater than a specified distance.

5. The rear seat passenger notification device of claim 1, wherein the at least one action item includes at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

6. The rear seat passenger notification device of claim 1, wherein the action determination and control device is configured to:

execute one of control of air conditioning of the host vehicle, control of at least one window of the host vehicle, control of at least one door of the host vehicle, or a combination thereof such that an interior temperature of the host vehicle, the interior temperature being in included in the information of the host vehicle, decreases when it is identified that the interior temperature is greater than or equal to a first temperature, and execute one of the control of air conditioning of the host vehicle, the control of the at least one window of the host vehicle, the control of the at least one door of the host vehicle, or the combination thereof such that the interior temperature of the host vehicle, the interior temperature being in included in the information of the host vehicle, increases when it is identified that the interior temperature is less than a second temperature lower than the first temperature.

7. The rear seat passenger notification device of claim 1, wherein the action determination and control device is configured to transmit a digital key of the host vehicle to a terminal of an external user adjacent to the host vehicle when presence of the external user is identified by means of adjacent information of the host vehicle, the adjacent information being included in the information of the host vehicle.

8. The rear seat passenger notification device of claim 1, wherein:

the sensor device is configured to:

divide an interior of the host vehicle into a plurality of areas based on a field of view (FOV) of at least one sensor included in the sensor device, and identify information of the at least one passenger with respect to each of the plurality of areas, and the action determination and control device is configured to:

identify the location where the at least one passenger is seated among the plurality of areas, and provide the user with the at least one action item to execute at least one of air conditioning control, window control, door control, or a combination thereof in an area adjacent to the location.

9. The rear seat passenger notification device of claim 1, wherein:

the sensor device is configured to identify that an external user adjacent to the host vehicle approaches the host vehicle using at least one camera, and the action determination and control device is configured to:

continue setting all doors of the host vehicle to the lock state, and transmit information about the external user to a terminal of the user.

10. The rear seat passenger notification device of claim 1, wherein the sensor device includes:

at least one camera configured to capture an area in front of the host vehicle, an area behind the host vehicle, and an area at a side of the host vehicle, and at least one rear occupant alert (ROA) sensor configured to divide and identify an interior of the host vehicle into a plurality of areas for each sitting seat.

11. A rear seat passenger notification method, comprising:

identifying, by a sensor device, information about at least one passenger who is present in a host vehicle, the information including at least one of a location where the at least one passenger is seated, a state where the at least one passenger is seated, an age group of the at least one passenger, or a combination thereof, when the host vehicle enters a lock state;

identifying, by the sensor device, whether the at least one passenger is an adult or a child using at least one of a detection area where a detected passenger is detected, a detection intensity where the detected passenger is detected, a detection height where the detected passenger is detected, a location where breathing of the detected passenger occurs, or a combination thereof;

performing, by an alarm device, a visual and audible alarm function including at least one of a visual alarm function, an audible alarm function, or a combination thereof, when it is identified that the information about the at least one passenger meets a specified condition including at least one of the detection area, the detection intensity, the detection height, or a combination thereof;

collecting, by an information collection device, information about the host vehicle and information about a user of the host vehicle when it is identified that the information about the at least one passenger meets the specified condition;

collecting, by a user location information collection device, a location of the user based on wireless communication with a user terminal;

identifying, by an outsider detection device, an outsider adjacent to the host vehicle using at least one of a biometric sensor, a motion sensor, an acceleration sensor, or a combination thereof;

identifying, by an action determination and control device, based on at least one of the information about the at least one passenger, the information about the host vehicle, the information about the user, or a combination thereof, at least one action item for control of the host vehicle; and providing, by the action determination and control device, the user with the at least one action item, including providing the user with a function to control a window adjacent to an area identified as including the child.

12. The rear seat passenger notification method of claim 11, wherein performing the visual and audible alarm function by the alarm device includes:

performing the visual and audible alarm function when it is identified, based on whether at least one of the detection area, the detection intensity, the detection height, or a combination thereof included in the specified condition is met, that the at least one passenger includes the child.

13. The rear seat passenger notification method of claim 11, wherein:

collecting the information by the information collection device includes collecting, by the information collection device, a separation distance between the user and the host vehicle when it is identified, based on whether at least one of the detection area, the detection intensity, the detection height, or a combination thereof included in the specified condition is met, that the at least one passenger includes the child, and performing the visual and audible alarm function by the alarm device includes gradually strengthening and repeatedly performing the visual and audible alarm function when it is identified that the separation distance is less than a specified distance.

14. The rear seat passenger notification method of claim 11, wherein:

collecting the information by the information collection device includes collecting a separation distance between the user and the host vehicle when it is identified, based on whether at least one of the detection area, the detection intensity, the detection height, or a combination thereof included in the specified condition is met, that the at least one passenger includes the child, and providing the at least one action item to the user by the action determination and control device includes transmitting, by the action determination and control device, a user interface including the at least one action item for the control of the host vehicle to a terminal of the user when it is identified that the separation distance is greater than a specified distance.

15. The rear seat passenger notification method of claim 11, wherein the at least one action item includes at least one of control of air conditioning of the host vehicle, control of starting of the host vehicle, control of at least one window of the host vehicle, control of at least one door of the host vehicle, communication with a terminal of the user, digital key transmission to a terminal of an external user adjacent to the host vehicle, or a combination thereof.

16. The rear seat passenger notification method of claim 11, wherein providing the at least one action item to the user by the action determination and control device includes:

executing, by the action determination and control device, one of control of air conditioning of the host vehicle, control of at least one window of the host vehicle, control of at least one door of the host vehicle, or a combination thereof such that an interior temperature of the host vehicle, the interior temperature being in included in the information of the host vehicle, decreases when it is identified that the interior temperature is greater than or equal to a first temperature, or executing, by the action determination and control device, one of the control of the air conditioning of the host vehicle, the control of the at least one window of the host vehicle, the control of the at least one door of the host vehicle, or the combination thereof such that the interior temperature of the host vehicle, the interior temperature being in included in the information of the host vehicle, increases when it is identified that the interior temperature is less than a second temperature lower than the first temperature.

17. The rear seat passenger notification method of claim 11, wherein providing the at least one action item to the user includes:

transmitting, by the action determination and control device, a digital key of the host vehicle to a terminal of an external user adjacent to the host vehicle when presence of the external user is identified, using adjacent information of the host vehicle, the adjacent information being included in the information of the host vehicle.

18. The rear seat passenger notification method of claim 11, wherein:

identifying the information about the at least one passenger includes dividing, by the sensor device, an interior of the host vehicle into a plurality of areas based on a field of view (FOV) of at least one sensor included in the sensor device and identifying, by the sensor device, information of the at least one passenger with respect to each of the plurality of areas, and providing the at least one action item to the user by the action determination and control device includes:

identifying, by the action determination and control device, the location where the at least one passenger is seated among the plurality of areas, and providing, by the action determination and control device, the user with the at least one action item to execute at least one of air conditioning control, window control, door control, or a combination thereof, in an area adjacent to the location.

19. The rear seat passenger notification method of claim 11, wherein:

identifying the information about the at least one passenger by the sensor device includes identifying, by the sensor device, that an external user adjacent to the host vehicle approaches the host vehicle using at least one camera, and providing the at least one action item to the user by the action determination and control device includes continuing, by the action determination and control device, setting all doors of the host vehicle to the lock state, and transmitting, by the action determination and control device, information about the external user to a terminal of the user.

20. The rear seat passenger notification method of claim 11, wherein the sensor device includes:

at least one camera configured to capture an area in front of the host vehicle, an area behind the host vehicle, and an area at a side of the host vehicle, and at least one rear occupant alert (ROA) sensor configured to divide and identify an interior of the host vehicle into a plurality of areas for each sitting seat.

* * * * *